United States Patent
Yiu

(10) Patent No.: US 11,102,694 B2
(45) Date of Patent: Aug. 24, 2021

(54) HIGH SPEED TRAIN IN NEW RADIO (NR)

(71) Applicant: Apple Inc., Cupertino, CA (US)

(72) Inventor: Candy Yiu, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/483,181

(22) PCT Filed: Mar. 5, 2018

(86) PCT No.: PCT/US2018/020898
§ 371 (c)(1),
(2) Date: Aug. 2, 2019

(87) PCT Pub. No.: WO2018/161073
PCT Pub. Date: Sep. 7, 2018

(65) Prior Publication Data
US 2020/0236605 A1   Jul. 23, 2020

Related U.S. Application Data

(60) Provisional application No. 62/466,882, filed on Mar. 3, 2017.

(51) Int. Cl.
*H04W 36/30* (2009.01)
*H04W 76/11* (2018.01)
(Continued)

(52) U.S. Cl.
CPC ........... *H04W 36/30* (2013.01); *H04W 36/32* (2013.01); *H04W 48/20* (2013.01); *H04W 76/11* (2018.02); *H04W 84/005* (2013.01); *H04W 84/04* (2013.01)

(58) Field of Classification Search
CPC ... H04W 36/32; H04W 84/005; H04W 24/02; H04W 36/0088; H04W 36/30; H04W 4/027; H04W 36/0009
See application file for complete search history.

(56) References Cited

U.S. PATENT DOCUMENTS

| | | | |
|---|---|---|---|
| 2014/0335865 A1* | 11/2014 | Zhang | H04W 36/0061 455/436 |
| 2015/0173017 A1* | 6/2015 | Rakotoharison | H04W 52/0222 370/311 |

(Continued)

FOREIGN PATENT DOCUMENTS

WO    2016141789 A1    9/2016

OTHER PUBLICATIONS

International Search Report dated May 17, 2018 for International Application No. PCT/US2018/0280898.

(Continued)

*Primary Examiner* — Jung H Park
(74) *Attorney, Agent, or Firm* — Eschweiler & Potashnik, LLC

(57) ABSTRACT

A network device such as an evolved NodeB (eNB) or next generation NodeB (gNB) can configure a set of user equipment (UE) to identify high speed train (HST) cell or high speed rail (HSR) dedicated longer term evolution (LTE) (HSDN) cells associated with a train or train station from a public LTE network. A UE can perform selection/reselection/handover operations to the HST LTE network cells with a higher priority based on various criteria, including a high mobility state of the UE, a marker, a cell ID, a measurement report comparison, or a location. Mobility state estimation of an HSDN cell can be based on a weight broadcast in a system information or system information block (SIB) of HSDN cell. A network load can further be considered in order to better serve high speed rail network conditions for users.

22 Claims, 8 Drawing Sheets

(51) Int. Cl.
*H04W 36/32* (2009.01)
*H04W 48/20* (2009.01)
*H04W 84/00* (2009.01)
*H04W 84/04* (2009.01)

(56) References Cited

U.S. PATENT DOCUMENTS

2017/0201919 A1* 7/2017 Chong .................. H04W 36/32
2017/0257800 A1* 9/2017 Lee ........................ H04W 76/30
2018/0167856 A1* 6/2018 Li .......................... H04W 28/00
2018/0213595 A1* 7/2018 Lee ...................... H04W 84/005

OTHER PUBLICATIONS

"Enabling of High Speed Train Indication." Source: Intel Corporation. Agenda Item: 8.1.3. 3GPP TSG-RAN WG2 #95bis, Kaohslung, Oct. 10-14, 2016. R2-166273. 14 pages.
3rd Generation Partnership Project; Technical Specification Group Radio Access Network; Study on performance enhancements for high speed scenario in LTE (Release 13). 3GPP TR 36.878 V13.0.0 (Jan. 2016). Advanced Pro LTE. 92 pages.
"Cell reselection for the UE on high-speed-dedicated network." Source: Intel Corporation, CMCC. Agenda Item: 9.19. 3GPP TSG RAN WG2 Meeting #100, Reno, United State, Nov. 30-Dec. 3, 2017. R2-1712616. 4 pages.
"Cell reselection for the UE on high-speed-dedicated network." Source: Intel Corporation. Agenda Item: 9.21.2. 3GPP TSG RAN WG2 Meeting #101, Athens, Greece, Feb. 26-Mar. 2, 2018. R2-1802987. 2 pages.

* cited by examiner

HIGH SPEED TRAIN IN NEW RADIO (NR)

REFERENCE TO RELATED APPLICATIONS

This application is a National Phase entry application of International Patent Application No. PCT/US2018/020898 filed Mar. 5, 2018, which claims priority to U.S. Provisional Application 62/466,882 filed on Mar. 3, 2017, entitled "HIGH SPEED TRAIN IN NEW RADIO (NR)" in the name of Candy Yiu and is hereby incorporated by reference in their entirety.

FIELD

The present disclosure relates to wireless technology, and more specifically to techniques for employing new radio (NR) communications for high speed train environments

BACKGROUND

One of the proposed work items for Release 15 of 3GPP is user equipment (UE) velocity oriented mobility management for long term evolution (LTE) networks for high speed trains (e.g., high-speed rails with rail transportation capable of about 200 kilometers per hour/120 miles per hour). As more users increasingly take high speed trains as their first choice of travel mode, and more cities are being connected by high speed railway, operators are trying to provide better coverage along the railway to better serve the users on high speed train. Operators have already exploited dedicated resources or specific designs for the coverage of high speed railway, which is normally called "High-speed-railway dedicated LTE network". The so-called "High-speed-railway dedicated LTE network" (or an HST non-station cell) can be different in eNB functionality and network structure from the network deployed for normal ground users or low-medium mobility users, which can be referred to as the "public LTE network" (or a station cell).

However, from the experience of operating and optimizing of the "High-speed-railway dedicated LTE network", it was found not only users on high speed train are absorbed into this dedicated network coverage and access, but also those low-medium mobility users who should have been intentionally served by the "public LTE network" are attracted to the dedicated network, and thus overloading or draining resources not intended for them. The main reason for this is because the dedicated network normally has better coverage to compensate the penetration loss of train carriage, and hence higher reference signal receive power (RSRP) than that of the nearby public network from a ground UE perspective, especially in those large population areas where there are a large proportion of overlapped coverage between the dedicated network and public network. So the UEs near the railway may more prefer camping on the dedicated network while it is not desired from the network operation point of view, which frequently causes congestion of the dedicated network, and deterioration of user experience on the train, as well as inefficient resource by overriding the effort on network planning with existing mechanism.

DETAILED DESCRIPTION

Figure 1:
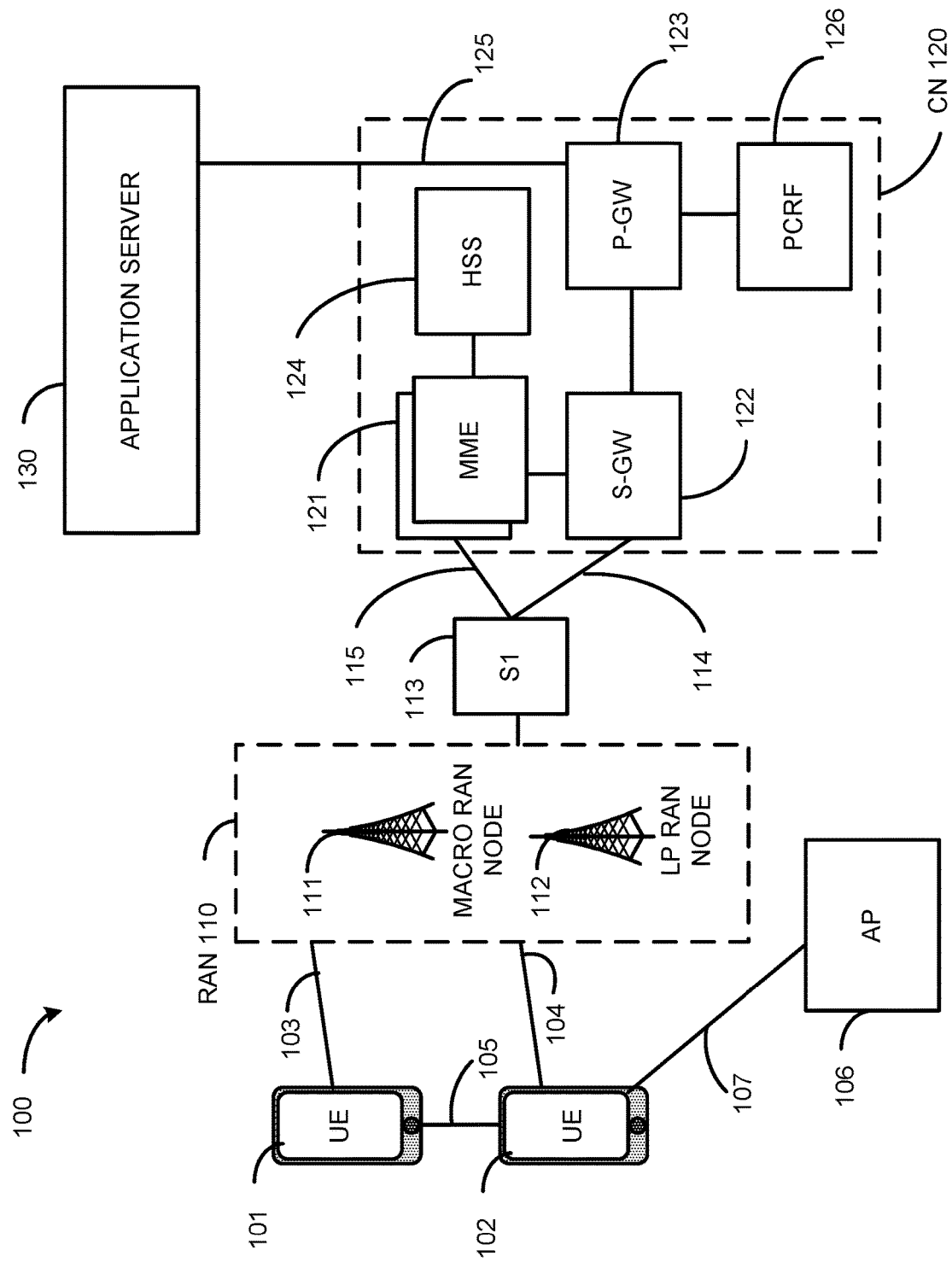
FIG. 1 is a block diagram illustrating an example user equipments (UEs) in a network with network components useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In consideration of various deficiencies or solutions described herein, various embodiments for network components to manage high speed train environments with one or more high speed dedicated networks (HSDNs) (e.g., high-speed-railway (HSR)/high-speed-train (HST) dedicated LTE cell(s) (HSR/HST LTE network(s))) alongside one or more public/non-station LTE networks) are envisioned. For example, network components (e.g., a base station, an eNodeB (eNB), a next generation NodeB (gNB) or other network component, or UEs) can operate to enable identification of a high-speed-railway dedicated LTE cell/network from a public LTE cell/network. Other aspects/embodiments of network components can enable cell selection/reselection/handover operations for one or more HSDNs at a station, train, or train carriage. Aspects further include operations for identifying whether a UE is in-train/located on a train/associated with the train so it can access the HSDNs, as well as enabling the train network (or the HSDN network to manage itself dynamically to allow UEs access that may be off the train or in the station or publically based on network load or other criteria (e.g., emergency or other conditions), for example.

Embodiments herein relate to mechanisms for various objectives. These objectives, for example, can include: specifying mechanism(s) for UE to identify cell's preference of serving UE of different velocity; specifying mechanism(s) for cell selection/reselection based on UE's self-evaluation of velocity; specifying a mechanism for refining legacy mechanisms for UE's self-evaluation of velocity: such as specifying a mechanism for assisting UE relatively actually identify the weight of each cell in estimation mobility state; specifying a mechanism for robust handover: specifying a mechanism for handover trigger with UE mobility state as well as cell's preference of serving velocity taken into account.

Further, cell selection/reselection and handover procedures are embodied herein for the high-speed railway dedicated network. For example, methods/operations are described to identify whether the UE is in-train so it can access high-speed railway dedicated network or not on the train. Further, in some embodiments enable a dynamic management of the train network environments, such as by enabling out-of-train UEs to use high-speed-railway dedicated network when it is under load.

In order to camp or operate communications on the suitable network as operator planned, a UE could be configured to recognize different networks where the UE can be configured to distinguish an HSDN (e.g., high-speed-railway (HSR)/high-speed-train (HST) dedicated LTE (HSR/HST LTE) network) from a public LTE network or train station ground network for low mobility users. Below are different aspects/embodiments to indicate a HSDN to the UE from a public LTE network, and likewise, for the UE to identify/distinguish such networks from one another.

In one embodiment, a one-bit indication in the system information (e.g., a system information block (SIB)) for an HSDN cell can be processed or generated to identify those cells dedicated to the high-speed-railway dedicated LTE network over the regular public LTE cells/networks. One or more indications for identification of the HSDN can be added with additional indications or provided by using existing indications. In other embodiments, cell selection/reselection can be configured based on a priority associated with network cells of the train or train station. For example, a UE can be provided a higher priority for cell selection/reselection to HSDN cells when in a higher mobility state (e.g., a velocity/speed associated with a high speed train) compared to a lower mobility state (e.g., a velocity/speed associated with a train station area, such as walking, running, parking, or the like). In another example, a UE can be provided a lower priority for cell selection/reselection to HSDN cells when in normal or medium mobility state.

In further embodiments, an HSDN cell weighting can be communicated to the UE and used as a criteria for determining a mobility state estimation (MSE), for example.

In still other embodiments, a UE can be configured to self-evaluate a mobility state estimation based on various criteria. For example, the UE can utilize a weight (weighting) to each of the HSDN cells in order to estimate a mobility state or generate a mobility state estimation (MSE). The HSDN cell weighting can based on the weight broadcasted in SIB to the UE. The UE then use the HSDN weight as the cell count in the mobility state estimation evaluation. In another embodiment, each cell may broadcast a list of neighboring HSDN cells to the UE to assist the UE in order to obtain the SIB of an HSDN cell during one or more cell reselection procedures.

Additional aspects and details of the disclosure further described below with reference to figures.

Embodiments described herein can be implemented into a system using any suitably configured hardware and/or software. FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface. As discussed herein, the UEs 101 and 102 can be communicatively coupled to networks of network devices 111, 112 (e.g., an HST (HSR) LTE network, a public LTE network (or non-station network), or other network, such as a boarding station network or the like).

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 can include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced the control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the EPC network 123 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
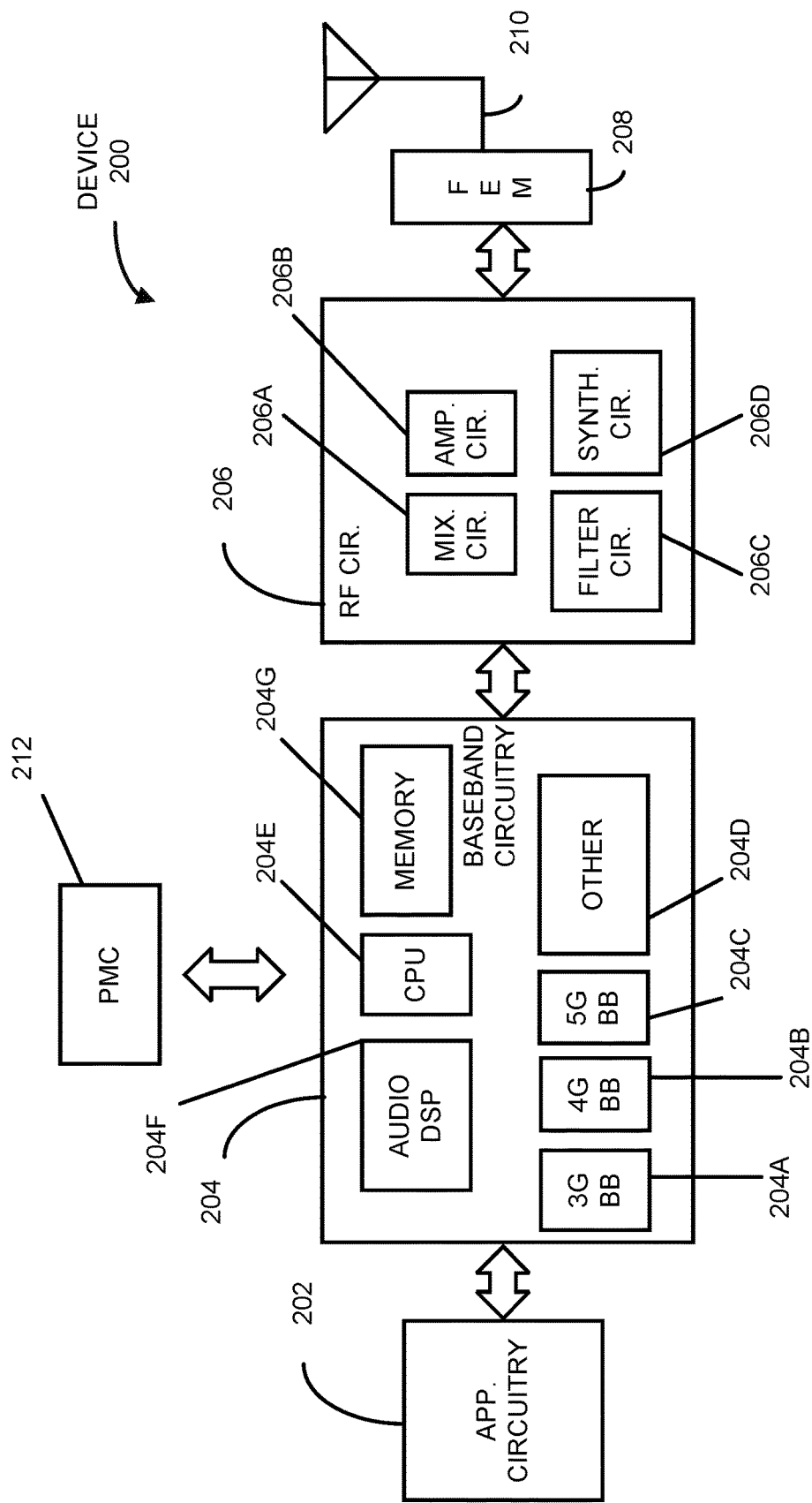
FIG. 2 is a diagram illustrating example components of a device that can be employed in accordance with various aspects discussed herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some embodiments, the device 200 can include less elements (e.g., a RAN node can not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuity 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tailbiting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In addition, the memory 204G (as well as other memory components discussed herein, such as memory 430, memory 530 or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for superheterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 2 12 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node.

Figure 3:
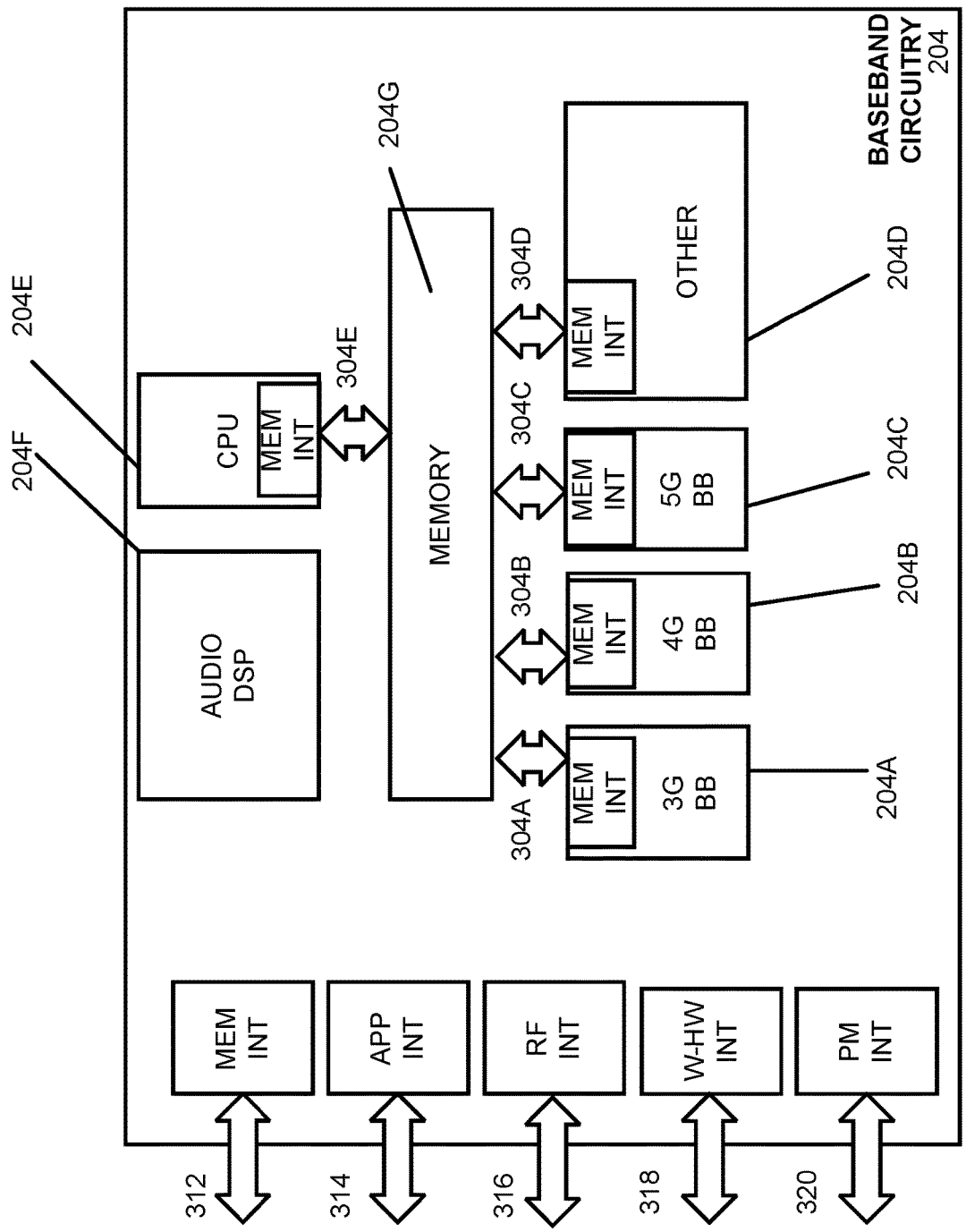
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
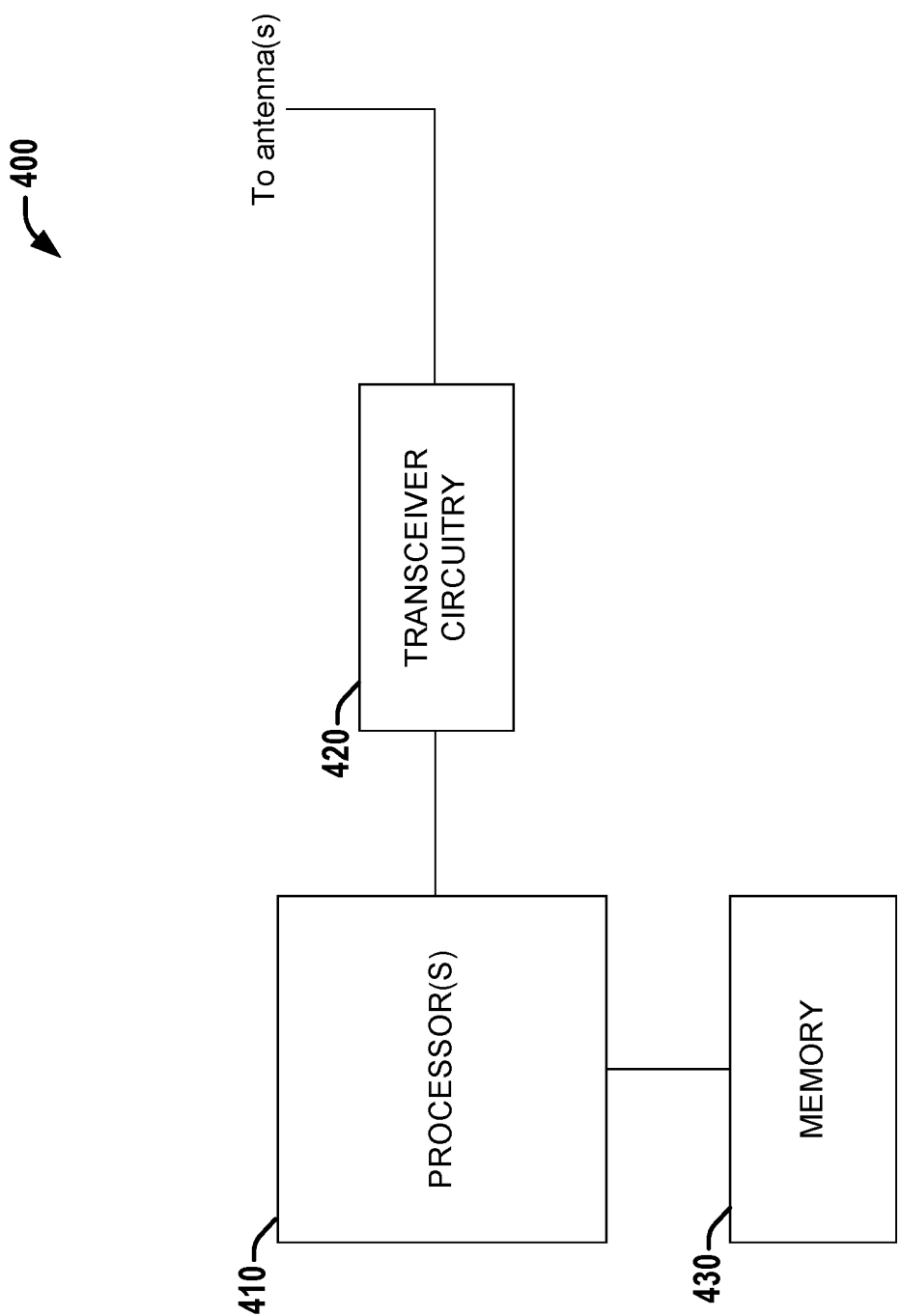
FIG. 4 is a block diagram illustrating a system or device employable at a UE that facilitates identification/selection/reselection/handover of high speed rail cells at a station, according to various aspects described herein.

Referring to FIG. 4, illustrated is a block diagram of a system 400 employable at a UE or other network device (e.g., IoT device) that facilitates/enable recognizing and handing over from one high-speed-railway (HSR)/high-speed-train (HST) dedicated LTE (HSR/HST LTE) network from a public LTE network according to various aspects described herein. System 400 can include one or more processors 410 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE).

In various aspects discussed herein, signals and/or messages can be generated and output for transmission, and/or transmitted messages can be received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor(s) 510, etc.) can comprise one or more of: identifying physical resources associated with the signal/message, detecting the signal/message, resource element group deinterleaving, demodulation, descrambling, and/or decoding.

Figure 5:
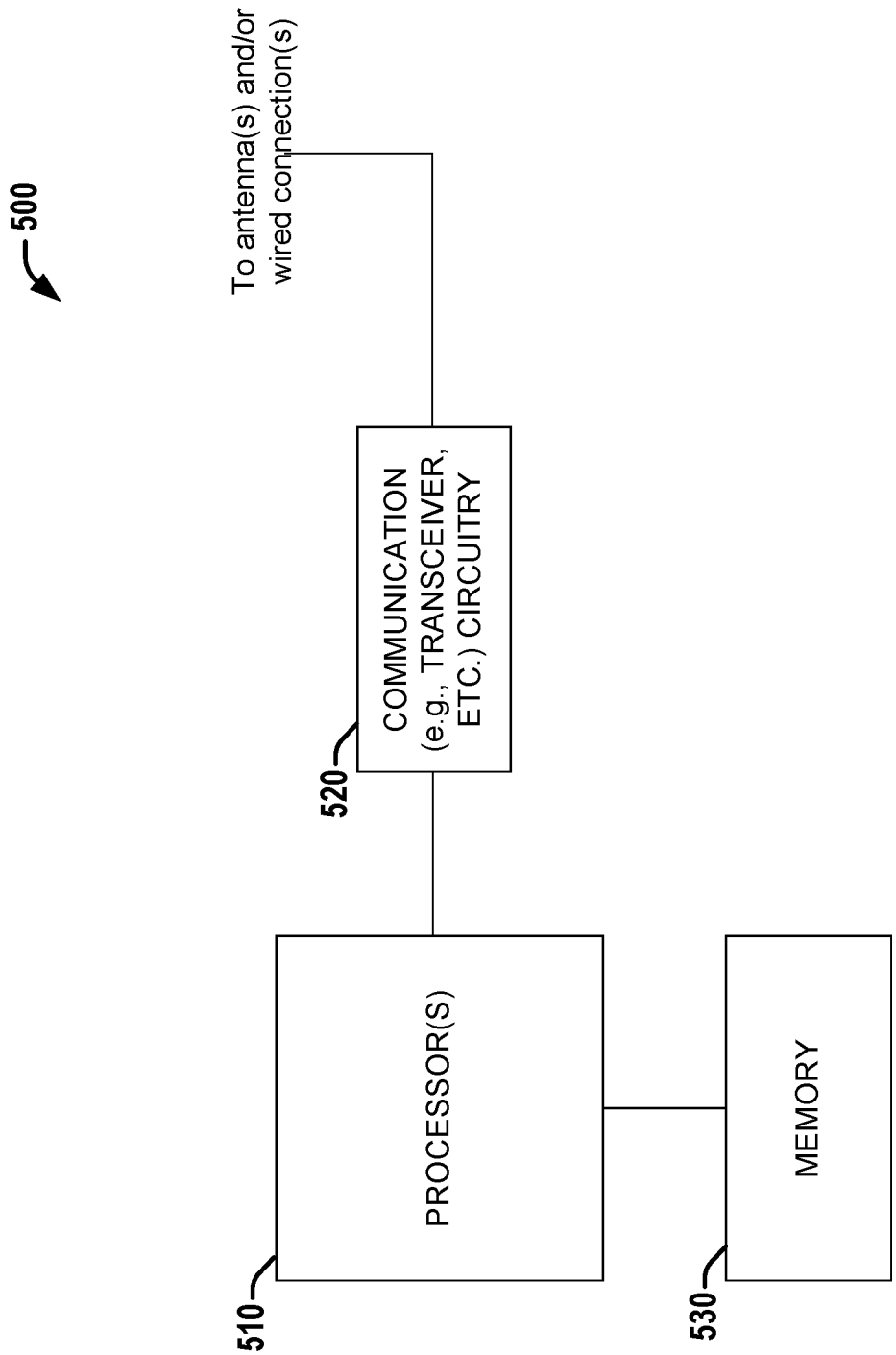
FIG. 5 is a block diagram illustrating a system or device employable at a BS (Base Station) that facilitates identification/selection/reselection/handover of high speed rail cells at a station, according to various aspects described herein.

Referring to FIG. 5, illustrated is a block diagram of a system 500 employable at a Base Station (BS), eNB, gNB or other network device that can enable generation and management of a high-speed-railway (HSR)/high-speed-train (HST) dedicated LTE (HSR/HST LTE) network from a public LTE network at train station. System 500 can include one or more processors 510 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can facilitate configuration of UE(s) for transmission of URLLC UE transmission(s) involving adaptable configuration(s) of one or more of search space, control channel resources, CCEs, aggregation levels, time instances, indices or the like.

In order to connect/operate on a suitable network as operator planned, the UE 400 of FIG. 4 can be configured to recognize different networks, i.e. UE 400 can be configured to distinguish a high-speed-railway (HSR)/high-speed-train (HST) dedicated LTE (HSR/HST LTE) network from a public LTE network, other non-station network or other station network (e.g., networks of 111, 112 of FIG. 1). Likewise, the eNB/gNB 500 (or 111, 112 of FIG. 1) can enable or facilitate mechanisms by which UEs 400 can discern between these networks at, near or located on a train/train station/train carriage and enable selection/reselection/handover operations effectively while maintaining a QoS within each network.

Figure 6:
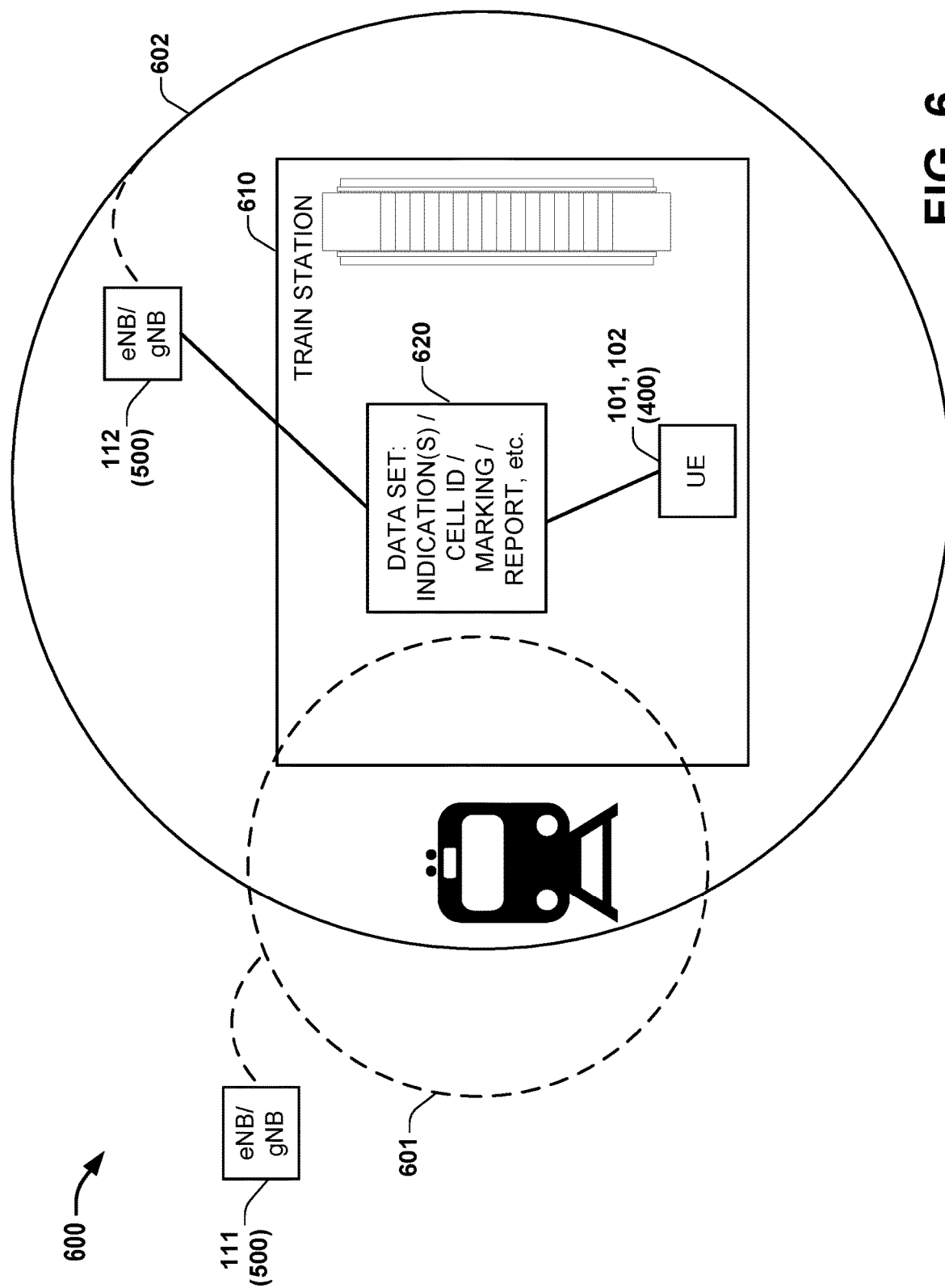
FIG. 6 is a diagram illustrating an example high speed rail network environment at a train station, according to various aspects discussed herein.

Referring to FIG. 6, illustrated is an example station network environment 600 to enable HST LTE network (or HSDN cells) and public LTE network operations for serving UEs of high speed railways with dedicated coverage to high speed mobility. Different networks at a train station 610 can include the HSDN 601 and a public LTE station network 602 enabled via the eNB/gNB 111 (or 500) and the eNB/gNB 112 (or 500), respectively for a UE 101, 102, or 400, for example.

In one aspect/embodiment, a network device (e.g., an eNB/gNB) providing a network coverage such as a train station network (e.g., a public LTE network 602 located at the station, or an HSDN 601) can operate to signal a data set 620, including an indication to one or more UEs 400 within the cell area of an available network (e.g., an HSDN 601 associated with a train cell of a particular train). This indication can enable one or more UEs 400 to identify that an HSDN 601 is present or has arrived within the vicinity of the station.

The HSDN 601 can have different parameters (e.g., bandwidth, frequency, signal power, received signal power, other power measure, or the like) than the public LTE network 602. For example, the HSDN 601 referred to herein can be an LTE Railway (LTE-R) network for high speed train lines capable of providing quality service or high speed service to UEs on the train up to about 250 km/hour (about 155 mph) or more. The network can include features such as Mission-Critical Push-to-talk (MCPTT) or other features based on 3GPP standards Release 13 or beyond, for example. An LTE-R network can be applied across multiple stations while being interoperable with legacy Trunked Radio System (TRS), Very High Frequency (VHF) systems, the national Public-Safety LTE (PS-LTE) network, or other communication systems. LTE-R can be a next-generation communications technology for smart train and metro services, enabling high-speed wireless voice and data communications inside trains, from train to ground and from train to train, for example.

In an aspect, the network device (eNB/gNB 500) either generating/controlling the HSDN 601 or the public LTE network 602, can identify that a HSDN 601 is available/present to other UEs within a coverage area. For example, the network device can signal a one-bit indication for a high-speed-railway dedicated LTE network, which can be, for example, communicated via a dedicated signaling or a system information block (SIB) to the UE as an identifier or identification indicator/indication. Each cell at the station can be identified as an HSDN 601 based on a state of the one-bit indicator, which can also be envisioned as one bit or a greater number of bits as a part of the SIB of the HDSN or a dedicated signal. In response to a detection of an HSDN 601 cell, a network device (e.g., the gNB 500) can indicate to the UE network information identifying the HSDN 601 cell over other cell networks (e.g., a public LTE network 602 or the like). The UE can then process network information to ascertain that a different network or a HSDN 601 is identified.

The HSDN 601, for example, can comprise a different set of QoS or network parameters/measures/values/attributes than other networks, which can be available to the UE for handover, fallback operations or other use in environments at a higher velocity than the public LTE network 602$s$.

In another example, the network device (e.g., eNB/gNB 500) or serving cell of a UE 400 can communicate a list of cell IDs. The list of cell IDs can enable the UE 400, for example, to identify the HSDN 601$s$ as well as any other public LTE network 602$s$ arriving or present at a station so that the UE can identify and associate thereto based on a priority or permit, for example. The list of cell IDs can be communicated to the UE 400 either via dedicated signaling or an SIB from the gNB 500 (eNB 500), as well as similarly be updated for various train carriers and their associated HSDNs 601 entering and existing through the station grounds based one or more updated criteria/parameters (e.g., priority, permit, unpermit, identification, or other indication).

In an example, the UE 400 can associate with/select/reselect/handover to the HSDN 601 in response the HSDN 601 having a higher priority than other networks along the train, region, train station or train rail path. This can occur when the UE 400 is in a high mobility state, as determined by the eNB 500 or in a self-evaluation by the UE 400 as a mobility state estimation (MSE), for example.

In another embodiment, a dedicated cell ID for one or more HSDN 601$s$ can be indicated to the UE 400 by its current serving cell (e.g., the public LTE network 602, or the HSDN 601 when attached thereto) in the region or locally that there is a potential detection of a high-speed-railway or HSDN 601. As a train arrives or draws closer to a station, an indication of one or more arriving networks can be signaled by the gNB 500. As various trains enter and exit the station, various networks could be enabled to be identified based on the particular train(s) associated with the users travel path by altering or modifying various indicators to the UE or the particular HST LTE cells for association with the UE 400, for example.

In response to an identification or recognition of one or more HSDN 601$s$, either by one or more bit indicators or cell IDs, network devices (e.g., the eNB/gNB 500 or UE 400) can operate to mark those high-speed-railway dedicated LTE networks with cells that are present within the station and cells that are not within the station or the coverage area of the station network (e.g., a station public LTE network 602 or the like), but may be traveling between stations or moving at a higher velocity dedicated for the train itself and outside of the coverage of the station network. For example, such marking or marker can be by another indicator other than just by a bit signaling or a cell ID list or data set, or otherwise be marked by another means such as by a class of traffic, LTE network measures (e.g., via an LTE network measurement report by the UE 400), HSDN 601 measures of measurement reports, a comparison of the two measurements between the public LTE network 602 and the HSDN 601 or the like, which as a result can provide a tag, flag, or other marking of a particular HSDN 601 for the UE 400.

In one example, a traffic marking can be utilized to identify certain traffic types for unique handling (e.g., HSDN 601 handling over the public LTE network 602), effectively partitioning network traffic into different categories or networks. After the network traffic is organized into classes by traffic classification, marking can allow can enable a mark that is, sets or changes a value (or attribute) for the traffic belonging to a specific class. For example, a UE 400 could change the class of service (CoS) value from 2 to 1 in one class, or want to change the differentiated services code point (DSCP) value from 3 to 2 in another class, in which these values can be referred to as attributes that are different there-between different categories or networks. The attributes that can be set and modified can include one or more of the following examples: cell loss priority (CLP) bit, CoS value of an outgoing packet, a discard-class value, a DSCP value in the type of service (ToS) byte, a discard eligible (DE) bit setting in the address field of a Frame Relay frame, ToS bits in the header of an IP packet, Multiprotocol Label Switching (MPLS) experimental (EXP) field on all imposed label entries, MPLS EXP field value in the topmost label on either an input or an output interface, Precedence value in the packet header, a quality of service (QoS) group identifier (ID), or the other values, for example that can be a part of or utilized to mark one network or category of UEs over another. Other markings or marks that tag, flag or further identify a UE or network can also be envisioned, for example, and are not limited to any one particular marking or mark of identification herein.

By being able to identify the cells that are within the coverage of the station and cells that are not within the coverage of the station, the eNB/gNB 500 of the service cell can enable UEs 400 to enter/connect with the HSDN 601 where it is available. In particular, a UE can be marked as on-board a train. In response to or based on the marking of the UE 400, for example, the eNB/gNB 500 can signal a permit indication/indicator that enables the UE to perform, or initiate, cell selection/reselection/handover within the HSR/HST LTE network/HSDN 601.

Alternatively or additionally, the UE 400 can identify the HST station cell by comparing the LTE measurement (e.g., public LTE network 602 measurement report) and the HST cell measurement/measurement report. If one or both reports satisfy some condition or a predetermined threshold for a parameter or measured value or attribute of the networks, the HSDN 601 can be considered as a HST station cell or public LTE cell. If there is a distinguishable difference between the report or particular measurements, such as one satisfying a threshold differential with respect to the other, then the HSDN 601 can be deemed an actual HST/HSR network that is distinguishable over a public LTE cell.

Other aspects/embodiments related to cell selection/reselection operations and mechanisms can also be processed in addition or alternatively. Because the HSDN 601 is intended to serve the UEs 400 with a high mobility state (e.g., the UEs associated with a moving high speed railway carriage or the like) and the public LTE network 602 is intended to serve the UEs 400 with low-medium mobility, the UE 400 can be configured to camp/operate on the particular network according to its velocity. As such, the gNB 500 can be configured to enable a velocity based cell (re-) selection.

In an aspect, processing circuitry of the UE 400 or gNB 500 can be configured to perform a cell (re)selection operation based on one or more of: a mobility state or a priority level of the UE, an HSDN 601 or a public LTE network 602. The mobility state could be a velocity level or a mobility rate associated with the UE 400. For example, if the UE 400 is moving faster than a walking speed (e.g., about 3-4 mph), a running speed (e.g., 6 to 9 mph), parking lot speed (e.g., less than 30 mph) or the like, then the UE 400, eNB/gNB 500 or other serving cell network device of the UE 400 can determine that the UE 400 is in a high mobility state instead of a low or medium mobility state associated with these other speeds, for example. The UE 400 could then be associated with the HSDN 601 and select the appropriate network (e.g., HSDN 601, public LTE network 602, or other station network) to implement handover/(re)selection to for the UE 400.

A public LTE network 602 herein can be referred to as an LTE cell network with a macro cell, as well as any network that is not a high-speed-rail/high-speed-train network, such as a Femto cell, pico cell, metro cell, WiFi network or the like for everyday mobility or non-train, non-high velocity mobility associated with walking, running, casual parking or the like, for example, which is in a lower mobility state or rate of velocity than the users associated with the HSDN 601.

A priority level can also be utilized, in lieu of a mobility state or in combination thereto, in order for the UE 400 to be able to determine that the UE 400 could be associated with the HSDN 601 or select an appropriate network over another. For example, different HSDN 601s could be associated with different trains at a station, as such these HSDN 601s, as well as the station network or public cell could be prioritized differently based on whether the given network for a train is associated with the one the UE is boarding, is located at, moving towards, including movement vectors/mobility state of the UE 400 itself. As such, the cell selection or (re)selection can be based on priority cells in conjunction with or separate from the UE 400's mobility state.

In one example, the UE 400 can only perform cell selection/reselection with higher priority when its mobility state/estimated velocity is medium or high, for example, with respect to the high-speed-railway dedicated network (HST/HSR LTE network). Medium or high can be a predetermined threshold above walking, running or some other speed, for example, that indicates the UE 400 is connected to, associate with, or on a train carriage or train to be associated with or communicatively coupled with an HSDN 601. Thus, in response to a velocity of the UE or an estimated mobility satisfying a predetermined threshold, the UE 400, or the eNB/gNB 400 can be configured to (re-) select the HSDN 601 over a public LTE network 602 at a train station, and, in response to the velocity of the UE not satisfying the predetermined threshold, (re)select the public LTE network 602 over the HSDN 601. This can be configured by the gNB 500, enabled by signaling to the UE 400 by the gNB 500, or preconfigured at the UE 400 to determine selection/re-selection based on a predetermined threshold of an estimated mobility/velocity as a current mobility state.

In another embodiment, the UE 400 can process a permit indication that enables it to camp (select/reselect/handover) to an HSDN 601. For example, the indication from the gNB 500 can operate to identify, tag or mark particular UEs 400 that are already on board in the train, associated with a particular train HSDN 601 as paid passengers, or enable/configure the UE to be allowed onto the particular HSDN 601 of a train as a pass. With this permit indication, the UE 400 can be configured to perform cell selection/reselection/handover in the HSDN 601.

In an aspect, the indication can be provided to mark a particular UE 400 with an HSDN 601 permit indication enabling the UE 400 to associate with the particular HSDN 601 from among several networks (e.g., the public LTE network 602/station grounds network/another public LTE cell/other HSDNs 601 associated with different trains or along a designated user railway). For example, a first UE (e.g., 101 of FIG. 1) 400 at the station area or grounds of the train station can be provided one permit indication for a first HSDN 601 (e.g., a network 111) associated with a particular high-speed-rail train, while another UE 102 can be associated with a different network (e.g., a network 112) and not be enabled to associated to the same HSDN 601s.

Instead of, or in conjunction with, communicating a network permit indication, as either a part of or combined with an indication identifying an HSDN 601 the gNB 500, for example, could mark the High-speed-railway permit indication to a particular UE 400. Then, in response to the particular UE's speed being above a threshold and the UE having detected the High-speed-railway cells or HSDN 601s, the UE 400 can then select/reselect/handover to the given HSDN 601 associated with the indication marked for the UE 400.

In another aspect, the UE 400 can only receive the permit indication or the gNB 500 provide the permit indication, when a measurement report or measurement comparison among reports occurs based on HST non station cells or connected to a public LTE network 602 in a connected state. Based on the reports or a comparisons a determination can be made whether the UE in low/med/high mobility, whether a measured cell is above a threshold in comparison to other cells, or both. For example, a controller or processing circuitry of the gNB 500 can be configured to trigger the measurement reports from the one or more UEs based on the one or more predetermined conditions. The gNB 500 can further process measurement reports with related time information of the HSDN 601, and then determine whether the one or more UEs are entering or located on the train carriage to then provide the permit indication to the one or more UEs based on the measurement reports and the time information. The UE can then be considered as associated with the HSDN 601 according to the permit indication over other networks at the station (e.g., a public LTE network 602, or other HSDN 601s on other trains), or associate with the corresponding HSDN 601 with a higher priority compared to other networks based on or designated by the permit indication, for example.

Various predetermined conditions or preconditions could be used by which to generate or process a permit indication that enable selection/reselection/handover by the UE 400. A permit indication can be different from an indication that identifies or marks a network, for example, with the former enabling a selection/reselection/handover initiation, while the later can identify a particular network for association or change a priority level.

Some example of these conditions for the permit indication to be generated by the gNB 500 or processed by a UE 400 can include one or more UEs satisfying a mobile/velocity threshold, the HSDN 601 being within a station area, or a triggered measurement report comparison between measurement reports of different networks indicating the HSDN 601 measurements above a measurement threshold or above measurements of a non-HSDN 601. A triggering of the network reports can be signaled by a gNB 500 in response to one or more conditions changing. In another example, a condition can include the HSDN 601 measurements comprising a signal degradation from the non-HSDN 601 and a signal quality increase of the HSDN 601. These conditions, for example, can be utilized to trigger the UE 400 or gNB 400 to identify an HST station cell by comparing the LTE measurements and the HST cell measurements of measurements reports, be used to then identify the particular HSDN 601 for the UE 500 and select/reselect/handover to such network based on one or more of measurement comparison results, the permit indication or an indication that identifies the HSDN 601 associated with the UE, for example.

In other aspects, the UE 400 can also perform a longer measurement window when detect HST cells and send measurement report together with the time information of the HST cells to the network. The network can then determine if the UE is entering the train to send a permit indication.

Further, the UE handover/cell reselect can be performed with a set number N of HSDN 601s, which can be configured by the eNB/gNB 500 or preconfigured. For example, based on the train or the number of trains at associated stations, a UE 400 can be configured with one or more N HST LTE cells by which the UE 400 can identify or have marked, and then handover to for network association.

Further aspects and embodiments can likewise relate to unmarking of the HSDN 601 such as by an unmark or unpermit indication to a particular UE 400 by the gNB 500 or by the UE 400 itself, for example. To unmark the HST/HSR permit indication to a particular UE 400, the UE 400 can be configured to start a timer and when the timer expires, the UE 400 can exit the permitted HST cells access. In an aspect, the UE can start the timer once it is camped on an HSDN 601 (or a non-station cell) or a public LTE network 602 (station cell) or upon entering a medium or low mobility state below a threshold, and once the timer expires it can disassociate with the HSDN 601 to another network of the train or public LTE network 602.

In addition or alternatively, once the UE speed/mobility state/velocity falls below a threshold or it enters low mobility state, the UE 400 can exit the permitted HST cells access.

In a connected mode (e.g., a non-HSDN 601, or a public LTE network 602, if not yet permitted to an HSDN 601, and on the HSDN 601 if permitted), the UE 400 can perform a longer measurement window when detecting one or more HSDN 601s by being triggered by the gNB 500 or by being preconfigured. A longer measurement window can be relative to a previous window measurement used for measurement reports on the public LTE network 602, for example. In response to detection of one or more HSDN 601 cells, the UE 400 can send a measurement report together with the time information of the HST cells to the network or the gNB 500. The network or the gNB 500 can then determine if the UE is exiting the train to send an unpermit indication or entering the train to send a permit indication, for example.

In another aspect, the UE handover/cell reselect can include up to N number of public LTE cells, which can be designated by a number N by the gNB 500 or be fixed/preconfigured, for example, so the UE can use a particular cell count to exit.

In other aspects/embodiments, the UE 400 (e.g., 101, 102, or the like) can operate to perform a mobility state estimation in accordance with one or more embodiments herein. The UE 400, for example, can perform a self-evaluation of one or more measurements, including an estimation of the mobility state (MSE), which can include a velocity, speed or direction, for example. In generally, the MSE can include an estimation the mobility state of a UE based on serving a cell change during a certain period. But in the high speed railway network, several remote radio units (RRUs) can be concatenated in line and work as only one cell to reduce the handover frequency and signaling overhead. For example, typically 8-12 RRUs can be concatenated, which can provide coverage along at least about 10 km of railway. Although the UE 400 could travel a relatively long distance in a certain period, the UE 400 could likely only change very seldom or over a few cells, which may lead to a scaling factor being less effective or even ineffective. Hence, improved mechanisms as described herein can be desired for supporting estimation of the mobility state of a UE.

In an aspect, in order to determine UE MSE in a HSDN 601, the UE 400 can count the HSDN 601 cells for cell reselection and handover, and a different mobility threshold (low/med/high) can be configured by the network to determine the mobility state. In order to count the different cells, the gNB 500 can actually set a different threshold for each of the HSDN 601 cells along the train rail for what is considered a low/medium/high threshold than with other station cells that could be stationary, grounded, or on other trains, for example. If in the high mobility threshold the UE 400 can be in a high mobility state based on a period between the different cells in order to determine the cell is still a HSDN 601 cell, for example. As such, it could count a very long train cell as one cell, but would not necessarily be accurate if it moves ten cells as a result of being a high speed cell. Thus, the UE 400 can be configured to count cells that are HST LTE cells according to a different threshold by which to count the cells along the railway, which can be different than a normal count operation in order to determine the mobility state and identify the different HST LTE cells from a different station cell, regular cell or a public LTE cell not on the train, for example.

In an embodiment, HST LTE cells can be weighted higher than a regular cell, such as a ten instead of a one count because it is considered a long cell. In particular, the network can configure a special weight to HST cells so that the UE can use the weight received and count the cell according to the weight. This can enable the UE 400 to cooperate in the Release 8 MSE. The weight can be signaled to the UE 400 via system information (e.g., an SIB). The UE 400 can perform a mobility state estimation based on the weight if it is cell (re)selected to or in the HSDN cell.

The UE can evaluate a mobility state estimation (MSE) based on at least one of the weights associated with the plurality of HSDN cells. These weights can be received as part of a signal in an SIB, a cell ID list or data set, or dedicated signaling, for example. The UE 400 can then select/reselect/handover to the one or more HSDN cells in response to being in a high mobility state with a higher priority than a public LTE network or non-HSDN cell, for example, based on the weight associated with each network cell.

In a further embodiment, a UE 400 can self-evaluate itself by counting cells as to whether it is in an HSDN state or connected to the HSDN 601. In aspect, the UE 400 can process a weight of the HSDN cell 601 and determine a mobility state based on a count of HSDN cells while connected to the HSDN cells. In one aspect, the UE 400 or the gNB 500 can further define the UE's mobility state as low/med/high, and if high then determine that the UE 400 is in an HSDN or HST state, which indicates the UE is in the train with ultra-high mobility. As long as the UE 400 400 or the gNB 500 identifies to be in HST, the UE 400 is in HST state. The UE can be considered to be in HST state by counting the number of HST cell within a period and if it exceeds some threshold configured by the network, it can be considered as HST state.

The mobility state threshold for the count can also be increased dynamically once the HST LTE state or connection to the HSDN is determined as a result of multiple HST LTE gNB/eNB 500 cells along a railway possibly defining one long cell in conjunction. For example, a period of time can be changed as a threshold so that the UE can count the number of cells within the period and if it satisfies or is above the threshold number, then it can be considered as still connected to the HSDN 601, in a high mobility state, or along a line of HSDN cells.

Other embodiments/aspects include making the UE handover operations from one cell to another robust and efficient. To make the UE handover procedure robustly, UEs (e.g., 101 or 102) of different velocity can determine or provide a preference on the measurement report of a potential target cell (e.g., 601 or 602) with the cell's characteristics or measurement parameters into account.

In an aspect, a new event for the HST cell 601 can be created, in which the event is only triggered and applied to the cell that is indicated as the HSDN 601. This even, for example, can operate as a trigger for the HSDN 601 only, and not necessarily apply to other networks at the same time or concurrently at the station 610. In response to an event (or condition) occurring, then the UE can provide a measurement report to the identified HSDN 601, in which the eNB/gNB 500 can utilized to make a handover decision, for example.

In another example, the eNB/gNB 500 can communicate a further indication (e.g., an indication trigger) as at least a part of the data set 620. The indication trigger can be an additional or different indication of the particular event or condition by which to be applied to only the HSDN 601, or for the UE 400 to measure it.

In another aspect, when the UE event trigger (or condition) occurs for the HST LTE cell 601, the UE 400 can be permitted to the HSDN 601 according to embodiments herein with respect to the permit indication. Alternatively or additionally, in response to the UE event trigger for HST cell, the UE 400 can be configured to report if it has the HST access permitted in case the network doesn't have this information that it has HST cell access when the trains are not in or located at the station 620.

In other embodiments, in order to keep the HST station cells from being overloaded when there is no train at the station 620, the UE 400 in the train station could be offloaded to HST station cells when it is under loaded, or when the HSDN 601 is under loaded from a capacity threshold number of UEs and the public/station LTE 602 is over a capacity for example. In one example, the eNB/gNB 500 can allow a non-permitted HST access UE to access or continue to access with an unpermit the HST station cells temporarily in connected mode, but they have to handover to LTE public network when the train arrives at the station, for example, in particular where the eNB/gNB at stationary locations along the rail path.

In one example, the UE trigger for an HST related measurement event can occur when the HST cells are under loaded, which can be signaled via a dedicated signaling (e.g., a dedicated bearer, dedicated time slots, dedicated physical channel, particular dedicated message, or the like) for the LTE network or the public LTE network 602, for example. In the event that the network becomes over loaded, or the train arrives, then the UE 400 can be handed back over from the HTE LTE network to the public/station LTE network 602. The UE 400 without HST access can then be forced to handover back to the LTE network 602.

In another example, the network can perform a massive handover by using a broadcast message to all UEs 400 which temporary handover to the HST cell 601. The UEs that have a temporary handover to HST cell can then be made to keep all configurations from the previous LTE cell 602 and handover back to LTE cell using a fast cell switch procedure, for example, in response to a trigger event or condition such as when the train arrives or the HST LTE cell 601 becomes over loaded beyond a threshold number, or the LTE cell 602 is under loaded below a threshold number, for example.

In a first set of examples to the various aspects/embodiments herein, the below examples are envisioned further.

Example 1 is a network signaled 1 bit for high-speed-railway dedicated long term evolution (LTE) network either in system information block (SIB).

Example 2 may include serving cell sends a list of cell identifier(s) (ID(s)) of the high-speed-railway dedicated LTE cell to the user equipment (UE) either via dedicated signal or SIB.

Example 3 may include dedicated cell ID for high-speed-railway, serving cell in the region can indicate to the UE that potential detection of high-speed-railway.

Example 4 may include parking high-speed-railway dedicated LTE network where the cells are within the station and cells that are not within the station.

Example 5 may include the UE can identify the high speed train (HST) station cell by comparing the LTE measurement and HST cell measurement. If they both satisfy some condition, the HST can be considered as HST station cell.

Example 6 may include the cell selection and reselection based on priority cell with its mobility state.

Example 7 may include the high-speed-railway permit indication in order to camp (select/reselect/handover) on High-speed-railway dedicated LTE network.

Example 8 may include the UE speed above a threshold and has detected the High-speed railway cells.

Example 9 may include the method of example 4 and/or some other example herein, wherein the UE can only receive permit indication when measurement report triggers based on HST non station cells. i.e. the UE in med/high mobility and measured HST non station cells above a threshold.

Example 10 may include the method of example 4 and/or some other example herein, wherein the UE measure signal degrade from HST station cells and signal increase from HST non station cells.

Example 11 may include in connected mode, the UE can perform a longer measurement window when detect HST cells and send measurement report together with the time information of the HST cells to the network. The network can then determine if the UE is entering the train to send permit indication.

Example 12 may include when the UE handover/cell reselect N number of HST cells (N configured by network or fixed).

Example 13 may include the UE starts a timer once the UE speed below a threshold or enter low mobility state. When the timer expires, the UE exit the permitted HST cells access.

Example 14 may include the UE exit the permitted HST cells access when the mobility state is low or UE speed below a threshold.

Example 15 may include the UE starts a timer when camped on HST station cell, the UE exit the permitted HST cells access when the timer expires.

Example 16 may include in connected mode, the UE can perform a longer measurement window when detect HST cells and send measurement report together with the time information of the HST cells to the network. The network can then determine if the UE is exiting the train to send permit indication.

Example 17 may include when the UE handover/cell reselect N number of public LTE cells (N configured by network or fixed).

Example 18 may include in order to determine UE mobility state in HST, the UE can count the HST cell for cell reselection and handover, a different threshold (low/med/high) can be configured by the network to determine mobility state.

Example 19 may include weighted HST cells higher than regular cell. The network can be configured a special weight to HST cells so the UE can cooperated in the release 8 (Rel) mobility state estimation (MSE) (the problem of this is that it may still mess up the regular MSE in LTE).

Example 20 may include define mobility state as low/med/high/HST, HST is indicates the UE is in the train with ultra-high mobility. As long as the UE is identify to be in HST, the UE is in HST state. The UE can be considered to be in HST state by counting the number of HST cell within a period and if it exceeds some threshold configured by the network, it is considered as HST state.

Example 21 may include create new event for HST cell, the event only triggered and applied to the cell that is indicated as HST.

Example 22 may include add a new indication to all the existing event if it can be applied only to HST cell.

Example 23 may include when the UE event trigger for HST cell, the UE has to be permitted as stated in embodiment 6.

Example 24 may include when the UE event trigger for HST cell, the UE needs to report if it has the HST access permitted in case the network doesn't have this information.

Example 25 may include the UE trigger HST related measurement event when the HST cells are under loaded which will be signaled via dedicated/SIB signaling from L TE network.

Example 26 may include the network can up to implementation to handover UE from LTE network to HST network when it is under loaded, but then it handover back to LTE when the train comes (UE on the train will handover to the HST network). The UE without HST access will be forced to handover back to LTE network.

Example 27 may include based on example 16 and/or some other example herein, wherein the network can perform a massive handover use broadcast message to all UE which temporary handover to HST cell. The UE who temporary handover to HST cell is required to keep all configuration from the previous L TE cell and handover back to LTE cell using some fast cell switch procedure.

Example 28 may include an apparatus comprising means to perform one or more elements of a method described in or related to any of examples 1-27, or any other method or process described herein.

Example 29 may include one or more non-transitory computer-readable media comprising instructions to cause an electronic device, upon execution of the instructions by one or more processors of the electronic device, to perform one or more elements of a method described in or related to any of examples 1-27, or any other method or process described herein.

Example 30 may include an apparatus comprising logic, modules, and/or circuitry to perform one or more elements of a method described in or related to any of examples 1-27, or any other method or process described herein.

Example 31 may include a method, technique, or process as described in or related to any of examples 1-27, or portions or parts thereof.

Example 32 may include an apparatus comprising: one or more processors and one or more computer readable media comprising instructions that, when executed by the one or more processors, cause the one or more processors to perform the method, techniques, or process as described in or related to any of examples 1-27, or portions thereof.

Example 33 may include a method of communicating in a wireless network as shown and described herein.

Example 34 may include a system for providing wireless communication as shown and described herein.

Example 35 may include a device for providing wireless communication as shown and described herein.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases.

Figure 7:
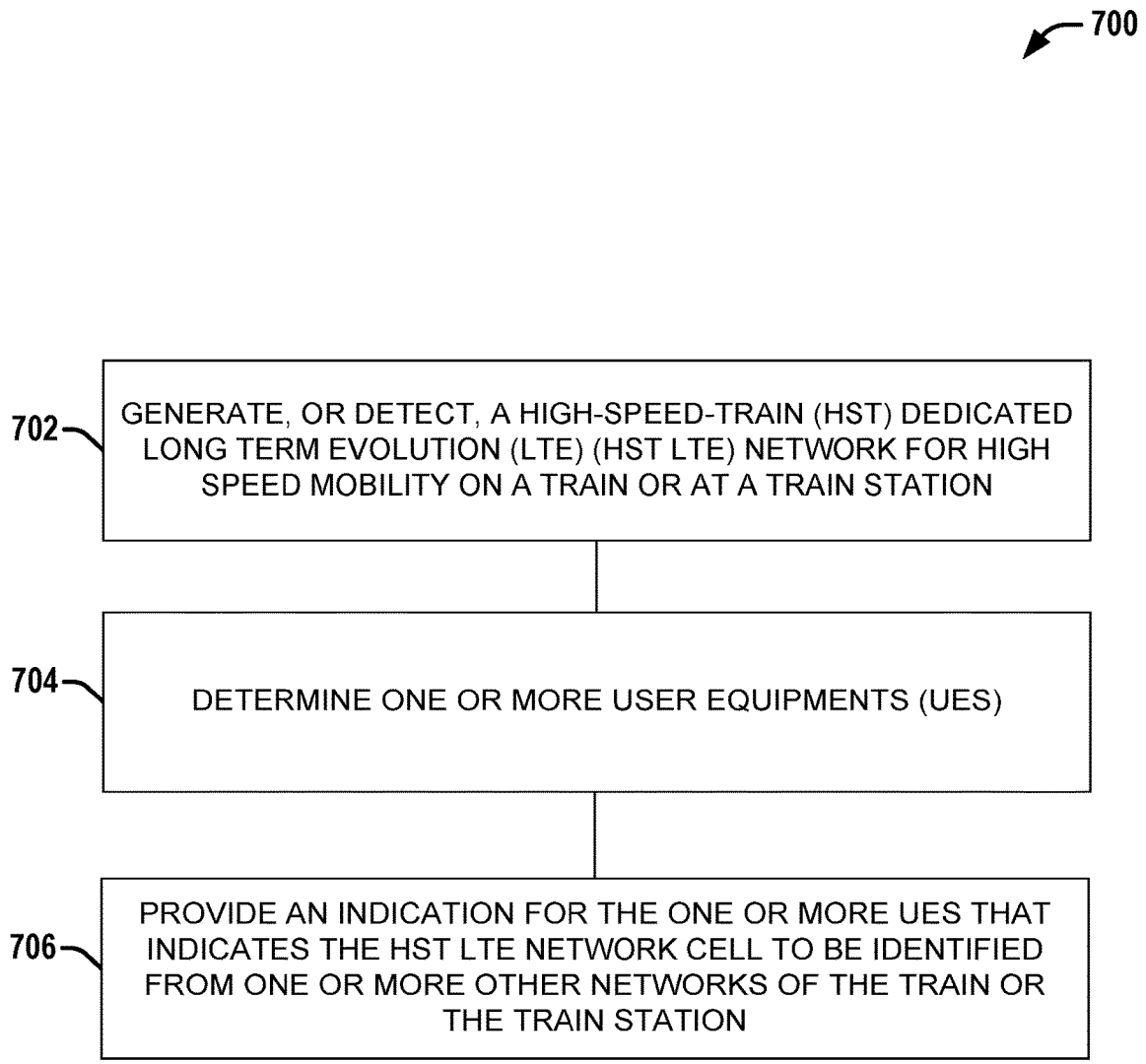
FIG. 7 is a flow diagram of an example method employable at a base station (BS) that facilitates identification/selection/reselection/handover of high speed rail cells at a station, according to various aspects described herein, according to various aspects discussed herein.

Referring to FIG. 7, illustrated is a flow diagram of an example method 700 employable at a gNB/eNB. The process flow 700 initiates at 702 with generating, or detecting, a high-speed-train (HST) dedicated long term evolution (LTE) (HST LTE) network cell or HSDN cell for high speed mobility on a train or at a train station.

At 704, the process flow 700 includes determining one or more user equipments (UEs), which could be later associated with the HST LTE network.

At 706, the process flow 700 includes providing an indication for the one or more UEs that indicates the HST LTE network to be identified apart from one or more other networks of the train or the train station.

In other embodiments, the process flow 700 can also include wherein the signaling the indication comprises communicating, via a system information block (SIB) or a dedicated signaling, at least one of: a one-bit indication, or a cell ID, identifying the HST LTE network.

The gNB/eNB (e.g., 500) can signal a data set comprising cell IDs associated with a plurality of HST LTE networks of the train station, region or railway to enable detection of HST LTE networks by the one or more UEs.

Alternatively or additionally, a mark HST LTE networks can be generated to indicate which networks are located at a station area or outside of the station area by which a UE can use to distinguish there-between.

Alternatively or additionally, a cell (re)selection operation can be performed with a UE based on a mobility state of the UE or a priority level of the HST LTE network. If the mobility state of the UE satisfies a predetermined threshold as a high mobility state, then the UE could (re)select the HSDN cell in the public LTE network at the train or train station, and, in response to the mobility of the UE not satisfying the predetermined threshold or being in a low or medium mobility state, the UE can (re)select the public LTE network over/instead of the HSDN LTE network with lower priority of HSDN cells, for example.

An indication, for example, can comprise a permit indication that enables the one or more UEs to select/reselect/handover to the HST LTE network based on one or more predetermined conditions. The predetermined conditions can comprise one or more of: the one or more UEs satisfying a mobile/velocity threshold, the HST LTE network being within a station area of the train station, a triggered measurement report comparison between measurement reports of different networks indicating the HST LTE network measurements are above a measurement threshold or above measurements of a non-HST LTE network, or the HST LTE network measurements comprising a signal degradation from the non-HST LTE network and a signal quality increase of the HST LTE network.

In other aspects, the process flow 700 can include measurement reports from the one or more UEs based on the one or more predetermined conditions, process measurement reports with related time information of the HST LTE network, and determine whether the one or more UEs are entering or located on the train to provide the permit indication to the one or more UEs based on the measurement reports and the time information.

Additionally or alternatively, the eNB/gNB 500 can initiate a timer in response to the one or more UEs falling below a mobility/velocity threshold or attaching to the HST LTE network; and, in response to the timer expiring, exiting the one or more UEs from the HST LTE network by expiring the permit indication or providing an unpermit indication that ceases to enable the one or more UEs association with the HST LTE network.

Additionally or alternatively, the eNB/gNB 500 can provide, via dedicated/SIB signaling, a UE trigger HST related measurement event when the HST LTE network is under loaded that enables a handover UE from a public LTE network to the HST LTE network and handover back to the public LTE network when the train arrives at the train station.

Additionally or alternatively, the eNB/gNB 500 can perform a massive handover via a broadcast message to the one or more UEs with a temporary handover to the HST LTE network and handover back to a public LTE network based on a saved configuration using a fast cell switch procedure.

Figure 8:
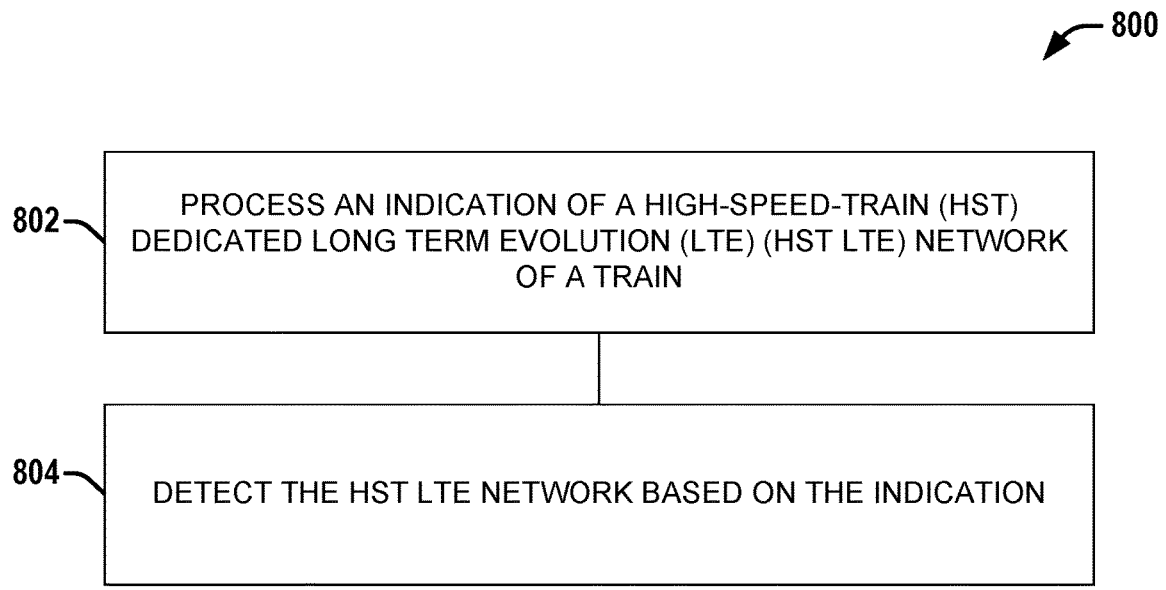
FIG. 8 is a flow diagram of an example method employable at a UE that facilitates identification/selection/reselection/handover of high speed rail cells at a station.

Referring to FIG. 8, illustrated is a flow diagram of an example method 800 employable at a UE (e.g., 400). The process flow 800 can initiate at 802 with processing circuitry configured to: process an indication of a high-speed-train (HST) dedicated long term evolution (LTE) (HST LTE) network of a train.

At 804, the UE can detect the HST LTE network based on the indication.

The process flow 800 can further include processing a communication, via a system information block (SIB) or a dedicated signaling, comprising at least one of: a one-bit indication, or a cell ID, that identifies the HST LTE network. Alternatively or additionally, the UE can process a data set comprising cell IDs associated with a plurality of HST LTE networks of a train station, a region, or a railway line to enable detection or a count of HST LTE networks.

Alternatively or additionally, the UE can mark HST LTE networks to indicate which networks are within a station area and which of the networks are outside of the station area.

Alternatively or additionally, the UE can perform measurement reports associated with networks of a train station, identify which of the networks comprise the HST LTE network and which of the networks comprise a public LTE network by comparing measurements of the measurement reports, and determine which of the networks to connect with based on the one or more predetermined criteria comprising at least one of a mobility state or the compared measurements.

Alternatively or additionally, the UE can wherein the processing circuitry is further configured to perform a cell (re)selection operation based on a low/medium/high/HST mobility state, and, in response to a mobility of the mobility state satisfying a predetermine threshold (e.g., being at least a high mobility state relative to high speed trains), (re)select to the HST LTE network instead of a public LTE network at a train station, and, in response to the mobility of the UE being in a low or medium mobility state that is less than the high state, the UE could (re)select the public LTE network instead of the HST LTE network.

Alternatively or additionally, the UE can select/reselect/handover to the HST LTE network in response to receiving the indication as a permit indication configured to enable an association with the HST LTE network, and in response to receiving an unpermit indication disassociating with the HST LTE network.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

In a second set of examples to the various aspects/embodiments herein, the below examples are envisioned further.

Claim 1 is an apparatus configured to be employed in a evolved Node B (eNB), comprising: processing circuitry configured to: generate, or detect, a high-speed-railway (HSR) dedicated long term evolution (LTE) (HST LTE) network (HSDN) cell for a high speed train; and determine one or more user equipments (UEs) to be provided an indication for the one or more UEs that indicates the HSDN cell to be identified apart from one or more other network cells of the train; a radio frequency (RF) interface, configured to provide, to RF circuitry, data for transmission of the indication.

Example 2 includes the subject matter of Example 1, wherein the signaling the indication comprises communicating, via a system information block (SIB) or a dedicated signaling, at least one of: a one-bit indication, or a cell ID, identifying the HSDN cell.

Example 3 includes the subject matter of any one of Examples 1-2, including or omitting any elements as optional, wherein the processing circuitry is further configured to signal a data set comprising cell IDs associated with a plurality of HSDN cells of a train station, region or railway to enable detection of HSDN cells by the one or more UEs.

Example 4 includes the subject matter of any one of Examples 1-3, including or omitting any elements as optional, wherein the processing circuitry is further configured to perform a cell selection, reselection, or a handover, for a UE to the HSDN cell from the one or more other network cells based on a mobility state of the UE.

Example 5 includes the subject matter of any one of Examples 1-4, including or omitting any elements as optional, wherein the processing circuitry is further configured to signal a threshold of a mobility state for the HSDN cell.

Example 6 includes the subject matter of any one of Examples 1-5, including or omitting any elements as optional, wherein the processing circuitry is further configured to generate a mark or a tag associated with the one or more UEs located at the train or that designates the one or more UEs as assigned to the train, wherein the mark or the tag is configured to enable the one or more UEs to be associated with the HSDN cell of the train in response to being on the train or a detection of the HSDN cell.

Example 7 includes the subject matter of any one of Examples 1-6, including or omitting any elements as optional, wherein the indication comprises a permit indication that enables the one or more UEs to select/reselect/handover to the HSDN cell based on one or more predetermined conditions.

Example 8 includes the subject matter of any one of Examples 1-7, including or omitting any elements as optional, wherein the one or more predetermined conditions comprises at least one of: the one or more UEs satisfying a mobile/velocity threshold, the HSDN cell being within a station area of a train station, a triggered measurement report comparison between measurement reports of different network cells indicating the HSDN cell measurements are above a measurement threshold or above measurements of a non-HSDN cell, or the HSDN cell measurements comprising a signal degradation from the non-HSDN cell and a signal quality increase of the HSDN cell.

Example 9 includes the subject matter of any one of Examples 1-8, including or omitting any elements as optional, wherein the processing circuitry is further configured to trigger the measurement reports from the one or more UEs based on the one or more predetermined conditions, process measurement reports with related time information of the HSDN cell, and determine whether the one or more UEs are entering or located on the train to provide the permit indication to the one or more UEs based on the measurement reports and the time information.

Example 10 includes the subject matter of any one of Examples 1-9, including or omitting any elements as optional, wherein the processing circuitry is further configured to initiate a timer in response to the one or more UEs falling below a mobility/velocity threshold or attaching to the HSDN cell; and, in response to the timer expiring, exiting the one or more UEs from the HSDN cell by expiring the permit indication or providing an unpermit indication that ceases to enable the one or more UEs association with the HSDN cell.

Example 11 includes the subject matter of any one of Examples 1-10, including or omitting any elements as optional, wherein the processing circuitry is further configured to generate an indication of a condition or an event that triggers a measurement report of the HSDN cell, enables a permission to the HSDN cell, or a report of association status with the HSDN cell by the one or more UEs.

Example 12 includes the subject matter of any one of Examples 1-11, including or omitting any elements as optional, wherein the processing circuitry is further configured to provide, via dedicated/SIB signaling, a UE trigger HST related measurement event when the HSDN cell is under loaded that enables a handover UE from a public LTE network cell to the HSDN cell and handover back to the public LTE network cell when the train arrives at a train station.

Example 13 includes the subject matter of any one of Examples 1-12, including or omitting any elements as optional, wherein the processing circuitry is further configured to perform a massive handover via a broadcast message to the one or more UEs with a temporary handover to the HSDN cell and handover back to a public LTE network cell based on a saved configuration using a fast cell switch procedure.

Example 14 is an apparatus configured to be employed in a user equipment (UE), comprising: processing circuitry configured to: process an indication of a high-speed-train (HST) dedicated long term evolution (LTE) (HST LTE) network (HSDN) cell; detect the HSDN cell based on the indication; and a radio frequency (RF) interface, configured to provide, to RF circuitry, data for reception of the indication.

Example 15 includes the subject matter of claim 14, wherein processing of the indication comprises processing a communication, via a system information block (SIB) or a dedicated signaling, comprising at least one of: a one-bit indication, a cell ID or a list of neighboring HSDN cells, that identifies at least the HSDN cell.

Example 16 includes the subject matter of any one of Examples 14-15, including or omitting any elements as optional, wherein the processing circuitry is further configured to process a data set comprising cell IDs associated with a plurality of HSDN cells of a train station, a region, or a railway line to enable a detection or a weight of HSDN cells.

Example 17 includes the subject matter of any one of Examples 14-16, including or omitting any elements as optional, wherein processing circuitry is further configured to mark HSDN cells to indicate which network cells are within a station area and which of the network cells are outside of the station area.

Example 18 includes the subject matter of any one of Examples 14-17, including or omitting any elements as optional, wherein the processing circuitry is further configured to perform measurement reports associated with network cells of a train station, identify which of the network cells comprise the HSDN cell and which of the network cells comprise a public LTE network cell by comparing measurements of the measurement reports, and determine which of the network cells to connect with based on the one or more predetermined criteria comprising at least one of a mobility state or the compared measurements.

Example 19 includes the subject matter of any one of Examples 14-18, including or omitting any elements as optional, wherein the processing circuitry is further configured to determine a mobility state estimation (MSE) based on a weight of the HSDN cell received in a system information block (SIB).

Example 20 includes the subject matter of any one of Examples 14-19, including or omitting any elements as optional, wherein the processing circuitry is further configured to select/reselect/handover to the HSDN cell in response to receiving the indication as a permit indication configured to enable an association with the HSDN cell, and in response to receiving an unpermit indication disassociating with the HSDN cell.

Example 21 includes the subject matter of any one of Examples 14-20, including or omitting any elements as optional, wherein the processing circuitry is further configured to process a number of HSDN cells to handover to, and perform measurements of the HSDN cell in a longer window than a public LTE network cell when the HSDN cell is detected, and, in response to the measurements, transmitting measurement reports with time information to receive a permit indication or an unpermit indication based on the measurement reports.

Example 22 includes the subject matter of any one of Examples 14-21, including or omitting any elements as optional, wherein the processing circuitry is further configured to process a weight of the HSDN cell and determine a mobility state based on a weight of HSDN cells and an LTE cell count. For example, the UE can count normal LTE cells as a one (e.g., 1) and the HSDN cell weighted at whatever is broadcast within a T time (configured) by a network. Then the UE can compare thresholds (configured) by the network to determine its MSE.

Example 23 is a computer readable storage medium storing executable instructions that, in response to execution, cause one or more processors of a user equipment (UE) to perform operations comprising: processing an indication of one or more high-speed-train (HST) dedicated long term evolution (LTE) (HST LTE) network (HSDN) cells; and detecting the one or more HSDN cells based on the indication.

Example 24 includes the subject matter of Example 23, wherein the operations further comprising: processing, via a system information block (SIB) or a dedicated signaling, at least one of: a one-bit indication, or a cell ID of the one or more HSDN cells; and identifying the one or more HSDN cells based on the one-bit indication, or the cell ID.

Example 25 includes the subject matter of any one of Examples 23-24, including or omitting any elements as optional, wherein the operations further comprising: processing a data set comprising cell IDs with weights associated with a plurality of HSDN cells of a train station, region or railway to enable a detection of and an association with the one or more HSDN cells.

Example 26 includes the subject matter of any one of Examples 23-25, including or omitting any elements as optional, wherein the operations further comprising: evaluating a mobility state estimation, and reselecting to the one or more HSDN cells in response to being in a high mobility state with a higher priority than a public LTE network or non-HSDN cell. In particular, the UE does not have to reselect to at least one HSDN cell. As long as it is in a high mobility state, it can be designated/provided with higher priority to reselect to the HSDN cell, for example.

Example 27 includes the subject matter of any one of Examples 23-26, including or omitting any elements as optional, wherein the operations further comprising: evaluating a mobility state estimation and reselecting to public LTE network cell in response to being in a low or medium mobility state with a higher priority than the one or more HSDN cells.

Example 28 can include an apparatus comprising means to perform one or more elements of a method described in or related to any of examples 1-27, or any other method or process described herein.

Example 29 can include one or more non-transitory computer-readable media comprising instructions to cause an electronic device, upon execution of the instructions by one or more processors of the electronic device, to perform one or more elements of a method described in or related to any of examples 1-27, or any other method or process described herein.

Example 30 can include an apparatus comprising logic, modules, and/or circuitry to perform one or more elements of a method described in or related to any of examples 1-27, or any other method or process described herein.

Example 31 can include a method, technique, or process as described in or related to any of examples 1-27, or portions or parts thereof.

Example 32 can include an apparatus comprising: one or more processors and one or more computer readable media comprising instructions that, when executed by the one or more processors, cause the one or more processors to perform the method, techniques, or process as described in or related to any of examples 1-27, or portions thereof.

Example 33 can include a method of communicating in a wireless network as shown and described herein.

Example 34 can include a system for providing wireless communication as shown and described herein.

Example 35 can include a device for providing wireless communication as shown and described herein.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus configured to be employed in a base station (BS), comprising:
   processing circuitry configured to:
      generate, or detect, a high-speed-railway (HSR) dedicated network (HSDN) cell for a high speed train; and
      determine to provide one or more user equipments (UEs) with an indication that identifies the HSDN cell apart from one or more other network cells;
      the indication comprising a permit indication that enables the one or more UEs to select/reselect/handover to the HSDN cell based on one or more predetermined conditions that comprise at least one of:
         the one or more UEs satisfying a mobile/velocity threshold, the HSDN cell being within a station area of a train station, a triggered measurement report comparison between measurement reports of different network cells indicating a HSDN cell measurements are above a measurement threshold or above measurements of a non-HSDN cell, or the HSDN cell measurements comprising a signal degradation from the non-HSDN cell and a signal quality increase of the HSDN cell;
      trigger the measurement reports from the one or more UEs based on the one or more predetermined conditions, process measurement reports with related time information of the HSDN cell, and determine whether the one or more UEs are entering or located on the train to provide the permit indication to the one or more UEs based on the measurement reports and the time information;

configure a weighting for the HSDN cell for performing a mobility state estimation (MSE) by the one or more UEs, wherein the weighting of the HSDN cell causes the HSDN cell to be weighted higher than other network cells in the MSE; and a radio frequency (RF) interface, configured to provide the indication and weighting to RF circuitry.

2. The apparatus of claim 1, wherein the indication is provided via a system information block (SIB) or a dedicated signaling, at least one of: a one-bit indication, or a cell ID, identifying the HSDN cell.

3. The apparatus of claim 1, wherein the processing circuitry is further configured to signal a data set comprising cell IDs associated with a plurality of HSDN cells of a train station, region or railway to enable detection of HSDN cells by the one or more UEs.

4. The apparatus of claim 1, wherein the processing circuitry is further configured to perform a cell selection, reselection, or a handover, for a UE to the HSDN cell from the one or more other network cells based on a mobility state of the UE.

5. The apparatus of claim 1, wherein the processing circuitry is further configured to signal a threshold of a mobility state for the HSDN cell.

6. The apparatus of claim 1, wherein the processing circuitry is further configured to generate a mark or a tag associated with the one or more UEs located at the train or that designates the one or more UEs as assigned to the train, wherein the mark or the tag is configured to enable the one or more UEs to be associated with the HSDN cell of the train in response to being on the train or a detection of the HSDN cell.

7. The apparatus of claim 1, wherein the processing circuitry is further configured to initiate a timer in response to the one or more UEs falling below a mobility/velocity threshold or attaching to the HSDN cell; and, in response to the timer expiring, exiting the one or more UEs from the HSDN cell by expiring the permit indication or providing an unpermit indication that ceases to enable the one or more UEs associated with the HSDN cell.

8. The apparatus of claim 1, wherein the processing circuitry is further configured to generate an indication of a condition or an event that triggers a measurement report of the HSDN cell, enables a permission to the HSDN cell, or a report of association status with the HSDN cell by the one or more UEs.

9. The apparatus of claim 1, wherein the processing circuitry is further configured to provide, via dedicated/SIB signaling, a UE trigger HST related measurement event when the HSDN cell is under loaded that enables a handover UE from a public network cell to the HSDN cell and handover back to the public network cell when the train arrives at a train station.

10. The apparatus of claim 1, wherein the processing circuitry is further configured to perform a massive handover via a broadcast message to the one or more UEs with a temporary handover to the HSDN cell and handover back to a public network cell based on a saved configuration using a fast cell switch procedure.

11. An apparatus configured to be employed in a user equipment (UE), comprising:
processing circuitry configured to:
process an indication of a high-speed-train (HST) dedicated network (HSDN) cell and process a weighting of the HSDN cell for performing a mobility state estimation (MSE);
detect the HSDN cell based on the indication;
weigh the detected HSDN cell, according to the weighting of the HSDN cell wherein the HSDN cell is weighted higher than other network cells in the MSE;
a radio frequency (RF) interface, configured to receive the indication and the weighting from RF circuitry; and
process a number of HSDN cells to handover to, and perform measurements of the HSDN cell in a longer window than a public network cell when the HSDN cell is detected, and, in response to the measurements, transmitting measurement reports with time information to receive a permit indication or an unpermit indication based on the measurement reports.

12. The apparatus of claim 11, wherein processing of the indication comprises processing a communication, via a system information block (SIB) or a dedicated signaling, comprising at least one of: a one-bit indication, a cell ID or a list of neighboring HSDN cells, that identifies at least the HSDN cell.

13. The apparatus of claim 11, wherein the processing circuitry is further configured to process a data set comprising cell IDs associated with a plurality of HSDN cells of a train station, a region, or a railway line to enable a detection or a weight of HSDN cells.

14. The apparatus of claim 11, wherein processing circuitry is further configured to mark HSDN cells to indicate which network cells are within a station area and which of the network cells are outside of the station area.

15. The apparatus of claim 11, wherein the processing circuitry is further configured to perform measurement reports associated with network cells of a train station, identify which of the network cells comprise the HSDN cell and which of the network cells comprise a public network cell by comparing measurements of the measurement reports, and determine which of the network cells to connect with based on one or more predetermined criteria comprising at least one of a mobility state or the compared measurements.

16. The apparatus of claim 11, wherein the processing circuitry is further configured to determine a mobility state estimation (MSE) based on a weight of the HSDN cell received in a system information block (SIB).

17. The apparatus of claim 11, wherein the processing circuitry is further configured to select/reselect/handover to the HSDN cell in response to receiving the indication as a permit indication configured to enable an association with the HSDN cell, and in response to receiving an unpermit indication disassociating with the HSDN cell.

18. A non-transitory computer readable storage medium storing executable instructions that, in response to execution, cause one or more processors of a user equipment (UE) to perform operations comprising:
processing an indication that identifies one or more high-speed-train (HST) dedicated network (HSDN) cells and processing a weighting of the one or more HSDN cells for performing a mobility state estimation (MSE);
detecting the one or more HSDN cells based on the indication;

weighing the one or more HSDN detected cells, according to the weighting of the one or more HSDN cells wherein the one or more HSDN cells are weighted higher than other network cells in the MSE; and process a number of HSDN cells to handover to, and perform measurements of the HSDN cell in a longer window than a public network cell when the HSDN cell is detected, and, in response to the measurements, transmitting measurement reports with time information to receive a permit indication or an unpermit indication based on the measurement reports.

19. The non-transitory computer readable storage medium of claim 18, wherein the operations further comprising:

processing, via a system information block (SIB) or a dedicated signaling, at least one of: a one-bit indication, or a cell ID of the one or more HSDN cells; and identifying the one or more HSDN cells based on the one-bit indication, or the cell ID.

20. The non-transitory computer readable storage medium of claim 18, wherein the operations further comprising:

processing a data set comprising cell IDs with weights associated with a plurality of HSDN cells of a train station, region or railway to enable a detection of and an association with the one or more HSDN cells.

21. The non-transitory computer readable storage medium of claim 20, wherein the operations further comprising:

evaluating a mobility state estimation, and reselecting to the one or more HSDN cells in response to being in a high mobility state with a higher priority than a public network or non-HSDN cell.

22. The non-transitory computer readable storage medium of claim 20, wherein the operations further comprising:

evaluating a mobility state estimation and reselecting to public network cell in response to being in a low or medium mobility state with a higher priority than the one or more HSDN cells.

* * * * *